(12) United States Patent
Akikuni et al.

(10) Patent No.: US 6,570,658 B1
(45) Date of Patent: May 27, 2003

(54) OPTICAL PART DRIVING DEVICE INCORPORATED INTO A DETACHABLE BLOCK AND OPTICAL INTERFEROMETER INCLUDING SAME

(75) Inventors: Fumio Akikuni, Tokyo (JP); Akio Ichikawa, Tokyo (JP); Eiichi Sano, Tokyo (JP)

(73) Assignees: Ando Electric Co., Ltd., Tokyo (JP); FK Optical Laboratory Co., Tokyo (JP)

( * ) Notice: Subject to any disclaimer, the term of this patent is extended or adjusted under 35 U.S.C. 154(b) by 0 days.

(21) Appl. No.: 09/538,155

(22) Filed: Mar. 29, 2000

(30) Foreign Application Priority Data

Mar. 29, 1999 (JP) .......................... 11-086738

(51) Int. Cl.$^7$ ................................ G01B 9/02
(52) U.S. Cl. ...................... 356/452; 356/455
(58) Field of Search ............... 356/452, 455; 359/871, 872, 877, 881

(56) References Cited

U.S. PATENT DOCUMENTS

| 4,165,183 A | * | 8/1979 | Hall et al. ............ 356/455 |
| 4,319,843 A | * | 3/1982 | Gornall .............. 356/455 |
| 4,332,461 A |   | 6/1982 | Cail et al. |

FOREIGN PATENT DOCUMENTS

| GB | 1 254 911 | 11/1971 |
| GB | 1 525 660 | 9/1978 |

* cited by examiner

Primary Examiner—Samuel A. Turner
(74) Attorney, Agent, or Firm—Oliff & Berridge, PLC

(57) ABSTRACT

An optical part driving device for moving an optical part, comprises; a driving timing pulley, a pair of driven timing pulleys, a timing belt wound by the driving timing pulley and the driven timing pulleys and connected with the optical part between the pair of driven timing pulleys, and a pair of tension pulleys for tensing the timing belt on both sides of the driving timing pulley.

10 Claims, 3 Drawing Sheets

OPTICAL PART DRIVING DEVICE INCORPORATED INTO A DETACHABLE BLOCK AND OPTICAL INTERFEROMETER INCLUDING SAME

BACKGROUND OF THE INVENTION

1. Field of the Invention

The present invention relates to an optical part driving device, for example, an optical part driving device which is useful for an optical interferometer used in an optical measurement technical field, and an optical interferometer to which the optical part driving device is applied.

2. Description of the Related Art

In optical interferometers which the Michelson interferometer represents, an incident light is divided into two optical paths for a transmitted light and a reflected light, which are perpendicular to each other, by using a beam splitter. Two lights reflected on each mirror disposed so as to be perpendicular to each optical path are multiplexed by a beam splitter again.

At the same time, a stage on which one mirror is mounted is moved at a constant speed and straightly. The optical path difference between the two lights reflected on the two mirrors is caused. A variety of intensity of interference fringes can be observed. The variety of intensity of interference fringes is fetched by the photo-detector as an electric signal.

The wavelength of a light can be measured more precisely by moving the movable mirror straight and a long distance.

As a driving device for a movable mirror, a ball screw mechanism, a timing belt device, a wire device or the like has been known.

In case of a timing belt device, a tension is applied to a timing belt by one tension pulley provided on one side of the timing belt.

However, when a timing belt device is used as a driving device for a movable mirror, in case of a low percentage of an engagement of a timing belt with a driving timing pulley, there is some possibility that the engagement fails during the drive of a timing belt device.

Because only one tension pulley is provided on one side of a timing belt, there is a problem about an initial moving time, in particular, a problem in which when the movable mirror is moved in right and left directions by using one tension pulley, a time difference is slightly caused between a right direction and a left one.

SUMMARY OF THE INVENTION

In order to solve the above-described problems, an object of the present invention is to provide an optical part driving device in which the percentage of the engagement of a timing belt with a driving timing pulley is increased in order to prevent the above failure in the engagement, and in which an optical part is moved at the same initial speed in both right and left directions in order to improve the accuracy thereof.

Another object of the present invention is to provide an optical interferometer in which the above optical part driving device is provided.

That is, in accordance with one aspect of the present invention, the optical part driving device for moving an optical part, comprises;

a driving timing pulley, a pair of driven timing pulleys, a timing belt wound by the driving timing pulley and the driven timing pulleys and connected with the optical part between the pair of driven timing pulleys, and a pair of tension pulleys for tensing the timing belt on both sides of the driving timing pulley.

As an optical part, a movable mirror for an optical interferometer, which moves straightly, is used. However, the present invention is not limited to this. Any other optical part may be used.

The tension pulley may be a timing pulley which has teeth corresponding to the timing belt or may be a simple pulley which has no teeth.

According to the present invention, because the optical part is connected with the timing belt wound by the driving timing pulley and a pair of driven timing pulleys between the pair of driven timing pulleys and a pair of tension pulleys for tensing the timing belt is provided on both sides of the driving timing pulley, the percentage of an engagement of the timing belt with the driving timing pulley is increased by a pair of tension pulleys provided for the timing belt on both sides of the driving timing pulley. As a result, the problem about the failure in the engagement can be solved. Further, the optical part can be moved at the same initial speed in both directions.

The driving timing pulley may be disposed at an approximate center between the pair of driven timing pulleys.

According to the present invention, because the driving timing pulley is disposed at an approximate center between the pair of driven timing pulleys, the distance between the driving timing pulley and one driven timing pulley is the same as one between the driving timing pulley and the other driven timing pulley. As a result, the optical part can be moved at the same initial speed in both directions.

In accordance with another aspect of the present invention, the optical interferometer is one wherein the plurality of optical parts are separated into a fixed optical part which is fixed to a casing and a movable optical part which is movable with respect to the casing, and the optical interferometer comprises an optical part driving device for moving the movable optical part comprising;

a driving timing pulley, a pair of driven timing pulleys, a timing belt wound by the driving timing pulley and the driven timing pulleys and connected with the movable optical part between the pair of driven timing pulleys, and a pair of tension pulleys for tensing the timing belt on both sides of the driving timing pulley.

For example, as an optical part, a beam splitter or a reflector is used.

According to the present invention, because the movable optical part is disposed on an optical axis which is approximately parallel to an optical axis of the reference light, the wavelength of a light can be measured more precisely by moving the movable optical part a long distance along an optical axis which is approximately parallel to the optical axis of the reference light. Further, the casing can be sufficiently small.

Because the optical interferometer comprises the above optical part driving device, the optical part can be moved at the same initial speed in both directions. The wavelength of a light can be measured more precisely.

In accordance with another aspect of the present invention, the optical interferometer in which a reference light and a light to be measured branch into two optical paths for a transmitted light and a reflected light, which are perpendicular to each other, by a beam splitter, and in which after the reflected light and the transmitted light are reflected on a plurality of reflecting members each other in each optical path, the reflected light and the transmitted light are multiplexed by the beam splitter to receive the multiplexed light by a photo-detector, is one wherein the plurality of reflecting members are separated into a fixed reflecting member which is fixed to a casing and a movable reflecting member which is movable with respect to the casing, and the optical interferometer comprises an optical part driving device for moving the movable reflecting member comprising;
　a driving timing pulley,
　a pair of driven timing pulleys,
　a timing belt wound by the driving timing pulley and the driven timing pulleys and connected with the movable reflecting member between the pair of driven timing pulleys, and
　a pair of tension pulleys for tensing the timing belt on both sides of the driving timing pulley.

For example, a representative reflecting member is a mirror. Instead of a mirror, for example, a corner cube or a reflector may be used.

The photo-detector is one for fetching a variety of intensity of interference fringes as an electric signal.

According to the present invention, because the movable reflecting member is disposed on an optical axis which is approximately parallel to an optical axis of the reference light, the wavelength of a light can be measured more precisely by moving the movable reflecting member a long distance along an optical axis which is approximately parallel to the optical axis of the reference light. Further, the casing can be sufficiently small.

Because the optical interferometer comprises the above optical part driving device, the movable reflecting member can be moved at the same initial speed in both directions. The wavelength of a light can be measured more precisely.

A pair of fixed reflecting members for reflecting the reflected light and the transmitted light toward the other fixed reflecting member each other may be provided, and a pair of movable reflecting members for totally reflecting a light toward each fixed reflecting member may be disposed between the pair of fixed reflecting members.

According to the present invention, because a pair of movable reflecting members for totally reflecting a light toward each fixed reflecting member is disposed between the pair of fixed reflecting members for reflecting the reflected light and the transmitted light toward the other fixed reflecting member each other, a wide range in which an optical path difference between two lights is caused can be obtained by moving the pair of movable reflecting members between the pair of fixed reflecting members on an optical axis which is approximately parallel to the optical axis of the reference light so as to reflect each light totally.

BRIEF DESCRIPTION OF THE DRAWINGS

The present invention will become more fully understood from the detailed description given hereinbelow and the accompanying drawings which are given by way of illustration only, and thus are not intended as a definition of the limits of the present invention, and wherein.

PREFERRED EMBODIMENT OF THE INVENTION

Hereinafter, an embodiment of the optical part driving device and that of the optical interferometer according to the present invention will be explained in detail with reference to FIGS. 1 to 5.

Figure 1:
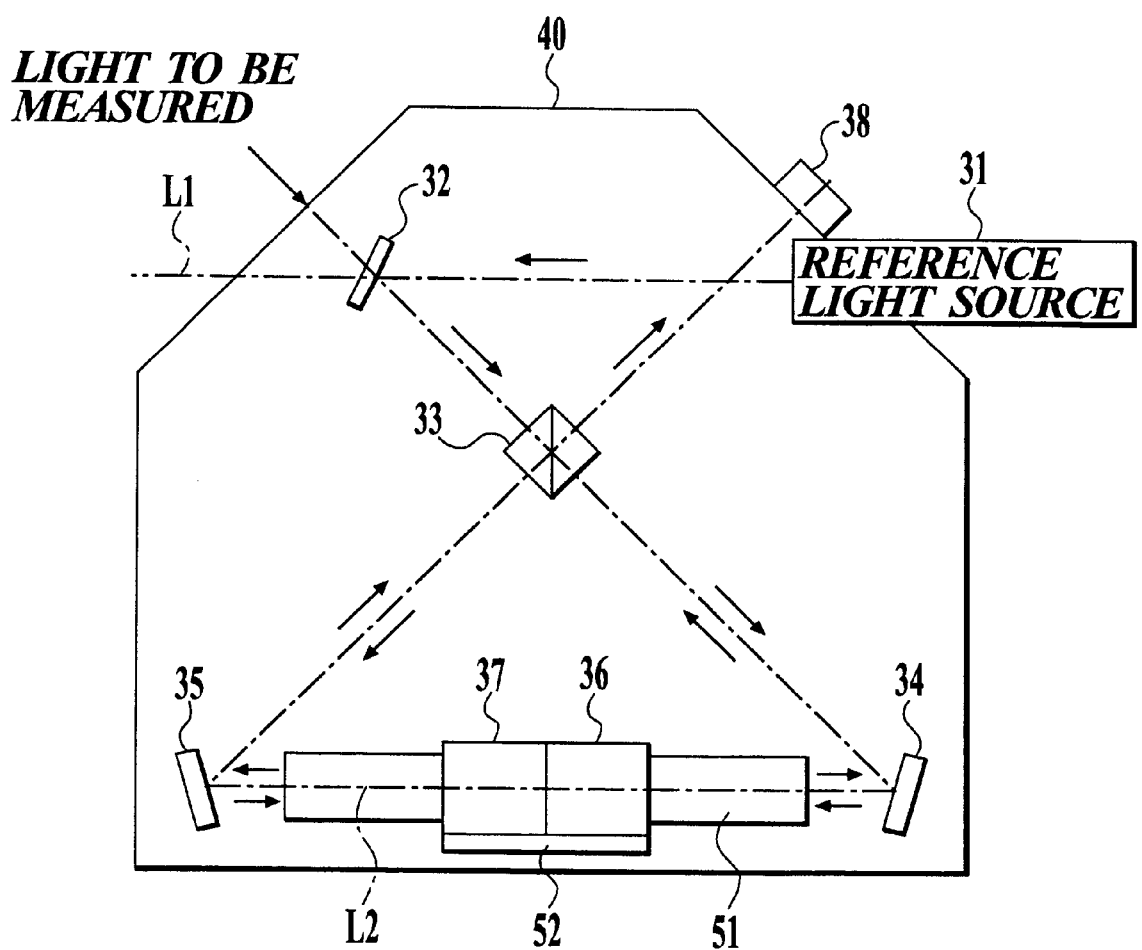
FIG. 1 is a plan view showing an example of a schematic construction of a small-sized optical interferometer as an example to which the present invention is applied.

FIG. 1 is a plan view showing an example of a schematic construction of a small-sized optical interferometer as an example to which the present invention is applied. In this figure, reference numeral L1 denotes a reference optical axis, L2 denotes a movable optical axis, 31 denotes a reference light source, 32 denotes a first mirror, 33 denotes a beam splitter, 34 denotes a second mirror, 35 denotes a third mirror, 36 and 37 denote movable mirrors (corner cubes), 38 denotes a photo-detector, 40 denotes a casing, 51 denotes a linear guide, and 52 denotes a mirror base.

In the small-sized optical interferometer, an He—Ne laser is used as a reference light source 31.

As shown in FIG. 1, a reference light (an He—Ne laser light) outgoing from the reference light source 31 passes along the reference optical axis L1 and is reflected on the first mirror 32 inside the casing 40. The reference light is incident on the beam splitter 33. Further, a light to be measured, which outgoes from the outside of the casing 40 is incident on the beam splitter 33. The light to be measured and the reference light pass along different optical paths which are on an upper stage and on a lower stage respectively. The two lights are incident on the beam splitter 33.

By the beam splitter 33, the incident light is divided into two optical paths for a transmitted light and a reflected light, which are perpendicular to each other. The transmitted light is reflected on the second mirror 34 toward the third mirror 35. The reflected light is reflected on the third mirror 35 toward the second mirror 34.

The light reflected on the second mirror 34 is totally reflected on the movable mirror 36 which is one corner cube. The light reflected on the third mirror 35 is totally reflected on the movable mirror 37 which is the other corner cube.

The movable mirrors 36 and 37 have a construction in which the mirrors 36 and 37 are movable on the linear guide 51 along the optical axis between the second mirror 34 and the third mirror 35.

The light which is totally reflected on one movable mirror 36 is reflected on the second mirror 34 and is incident on the beam splitter 33 again. The light which is totally reflected on the other movable mirror 37 is reflected on the third mirror 35 and is incident on the beam splitter 33 again.

The transmitted light and the reflected light are multiplexed by the beam splitter 33. At the same time, by moving a pair of movable mirrors 36 and 37 which are corner cubes on the linear guide 51 along the optical axis at a constant speed, the optical path difference between the transmitted light and the reflected light which are reflected on two movable mirrors 36 and 37 is caused. A variety of intensity of interference fringes can be observed.

The variety of intensity of interference fringes is fetched by the photo-detector 38 as an electric signal.

The optical axis of the transmitted light and the reflected light which are reflected on two movable mirrors 36 and 37 is referred to as the movable optical axis L2.

As described below, in case of an optical system in which two movable mirrors 36 and 37 are removed, the optical paths are as follows.

Figure 2:
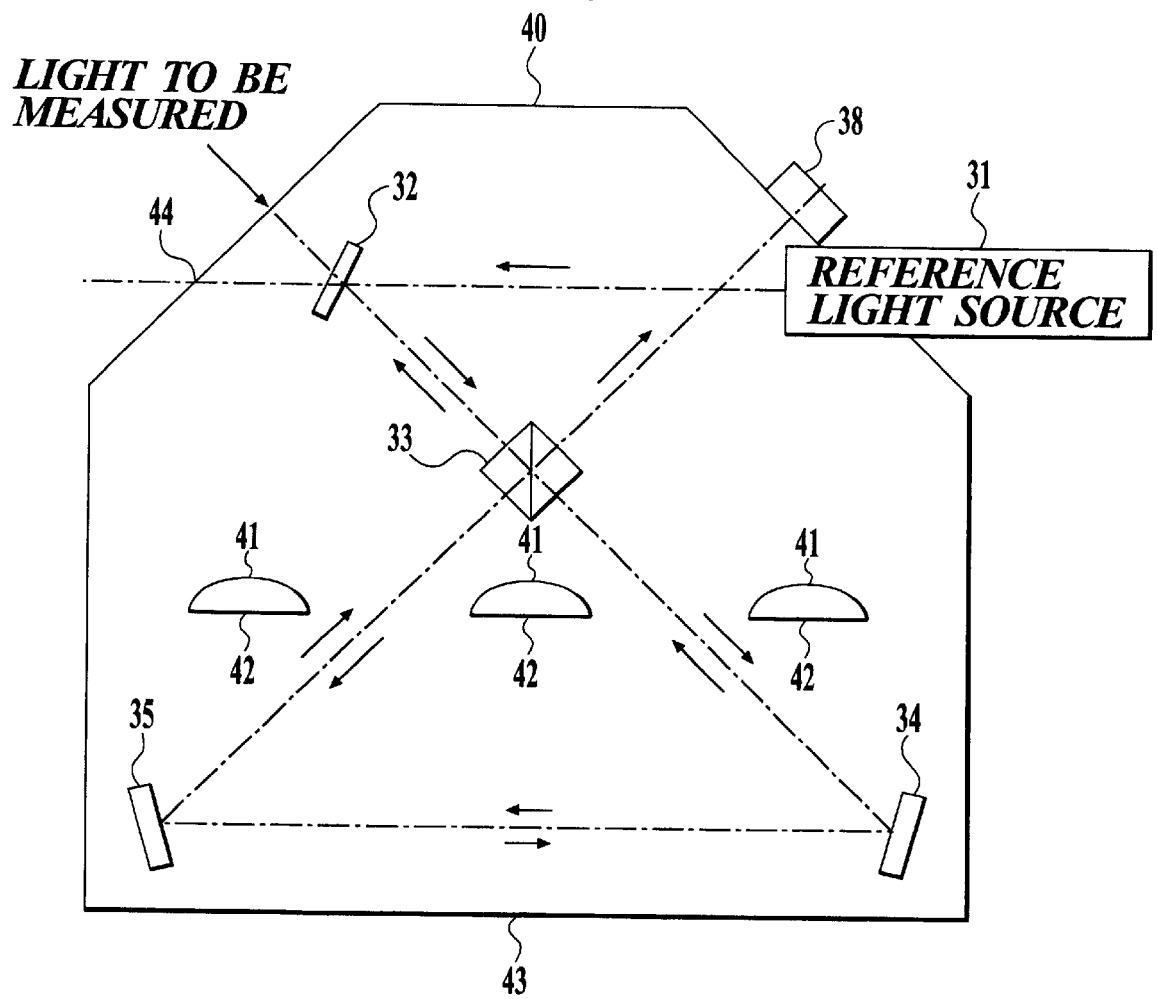
FIG. 2 is a plan view showing fixed optical parts which are disposed in a casing according to the small-sized optical interferometer shown in FIG. 1.

That is, as shown in FIG. 2, the transmitted light divided by the beam splitter 33 is reflected on the second mirror 34 toward the third mirror 35. The light reflected on the second mirror 34 is reflected on the third mirror 35 and is incident on the beam splitter 33 again.

The reflected light divided by the beam splitter 33 is reflected on the third mirror 35 toward the second mirror 34. The light reflected on the third mirror 35 is reflected on the second mirror 34 and is incident on the beam splitter 33 again.

After the transmitted light and the reflected light are multiplexed by the beam splitter 33, the interference between two lights is caused. The interference is fetched by the photo-detector 38 as an electric signal.

In the above small-sized optical interferometer, as shown in FIG. 2, a plurality of bosses 41, 41, and 41 (in the figure, the number of the bosses is 3) are provided in the casing 40. The first reference surfaces 42, 42 and 42 are formed on these bosses 41, 41 and 41 so that these surfaces are on the same plane. Further, the second reference surface 43 is formed on the external form portion of the casing 40.

The first reference surfaces 42, 42 and 42 and the second reference surface 43 are parallel with each other. The first reference surfaces 42, 42 and 42 face to the second reference surface 43 and are obtained by carrying out a high precise process for a flat surface.

Figure 3:
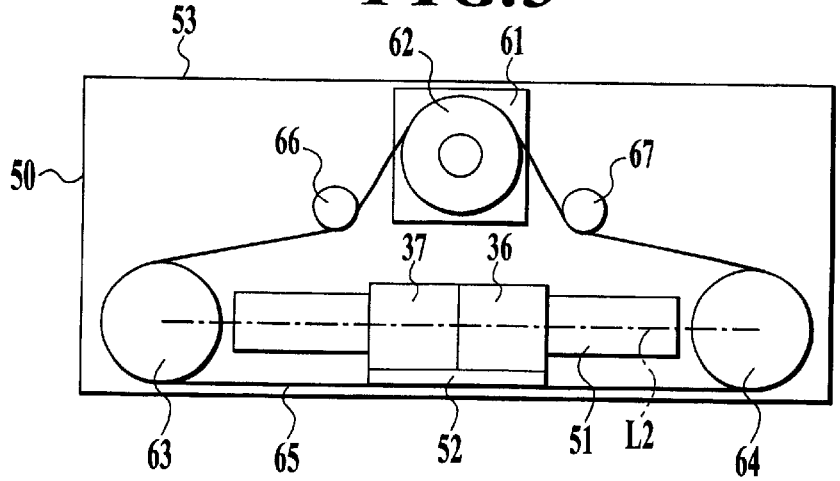
FIG. 3 is a plan view showing a state in which movable optical parts and a driving system thereof are removed with a block according to the small-sized optical interferometer shown in FIG. 1.

FIG. 3 is a plan view showing a state in which the movable mirrors 36 and 37 and the driving system thereof are removed with a block 50. In the figure, the reference numeral 53 denotes a reference surface, 61 denotes a motor (a stopping motor), 62 denotes a driving timing pulley, 63 and 64 denote driven timing pulleys, 65 denotes a timing belt, and 66 and 67 denote tension pulleys.

That is, as shown in FIG. 3, the linear guide 51 is provided on the block 50 unitedly or in one united body. The central motor 61, the driving timing pulley 62, the left driven timing pulley 63, the right driven timing pulley 64 and the tension pulleys 66 and 67 are provided on the block 50.

The timing belt 65 is attached to the driving timing pulley 62 provided on the output shaft of the motor 61, and to the driven timing pulleys 63 and 64 which are provided on both sides of the linear guide 51. The timing belt 65 is fixed to the mirror base 52 in which two movable mirrors 36 and 37 are provided.

The tension pulleys 66 and 67 for tensing the timing belt 65 suitably are disposed on both sides of the driving timing pulley 62.

The end face of the block 50, to which the motor 61 is provided close is a reference surface 53 corresponding to the first reference surfaces 42, 42 and 42 of the casing 40. The reference surface 53 is obtained by carrying out a high precise process for a flat surface.

The linear guide 51 (the movable optical axis L2) is provided on the block 50 so as to be parallel with the reference surface 53. The block 50 is fixed to the casing 40 with screws so that the reference surface 53 is in contact with the first reference surfaces 42, 42 and 42.

Next, the method for using the above small-sized optical interferometer will be explained.

When the block 50 is not attached to the casing 40, two movable mirrors 36 and 37 which are corner cubes do not exist on the movable optical axis L2. As shown in FIG. 2, the reference light outgoes far from a reference optical axis through hole 44 toward the outside of the casing 40. Thereby, the accuracy of the parallel between the reference optical axis L1 of the reference light which outgoes soon from the reference light source 31 and both the first reference surface 42 of the casing 40 and the second reference surface 43 thereof can be adjusted more precisely.

When the optical axis (referred to the movable optical axis L2) which is generated by the second mirror 34 and the third mirror 35 is adjusted so as to be parallel with the second reference surface 43 of the casing 40, as described above, the interference between the transmitted light and the reflected light can be caused only by fitting the movable optical axis L2 generated by the movable mirrors 36 and 37 on the block 50, which are previously adjusted at the outside of the casing 40, to the optical axis generated by the second mirror 34 and the third mirror 35.

The movable mirrors 36 and 37 can be adjusted mechanically and optically by removing the whole block 50 from the casing 40. In the concrete, the movable mirrors 36 and 37 which are corner cubes can be adjusted by a collimator and a laser on the basis of the reference surface 53 of the block 50.

Because the block 50 can be removed from the casing 40, the linear guide 51, the mirror base 52, the motor 61, the pulleys 62, 63 and 64, the timing belt 65 are the like, which are consumable parts can be exchanged easily.

As described above, by removing the movable optical parts as a block 50 from the casing 40, the fixed optical parts and the movable optical part can be separately adjusted mechanically and optically. That is, by removing the movable mirrors 36 and 37 (the movable reflectors) and the driving system thereof (the motor 61, the pulleys 62, 63 and 64, the timing belt 65 and the like) with the block 50 from the casing 40, the beam splitter 33 and the fixed reflectors (the mirrors 32, 34 and 35) can be adjusted mechanically and optically so that the movable mirrors 36 and 37 are adjusted separately from them.

Therefore, the maintenance of the movable mirrors 36 and 37 can be improved. Because the beam splitter 33 and the mirrors 32, 34 and 35 which are inside the casing 40 can be adjusted optically by removing the movable mirrors 36 and 37 with the block 50 from the casing 40, the accuracy of the ratio of the optical interference can be improved. Further, the casing 40 can be efficiently small.

The movable mirrors 36 and 37 can be moved a long distance along the movable optical axis L2 which is parallel with the reference optical axis L1. As a result, the wavelength of a light can be measured more precisely. Further, the casing 40 can be efficiently small.

Because each light is totally reflected on a pair of movable mirrors 36 and 37 which is moved on the movable optical axis L2 which is parallel with the reference optical axis L1 between a pair of the fixed mirrors 34 and 35, it is possible to obtain a wide range in which an optical path difference between two lights is caused.

As described above, the motor 61 and the output axis 61a of the motor 61 are positioned at the approximate middle point between the second mirror 34 and the third mirror 35.

Therefore, a pair of movable mirrors 36 and 37 can be moved at the same initial speed in both right and left directions by driving the motor 61 via the output shaft 61a, the driving pulley 62 and the timing belt 65.

Because the motor 61 is close to both right and left driven timing pulleys 63 and 64, the initial speed of the movable mirrors 36 and 37 can be high to the utmost in both right and left directions by using the timing belt 65. The measurement time can be shortened.

Figure 4:
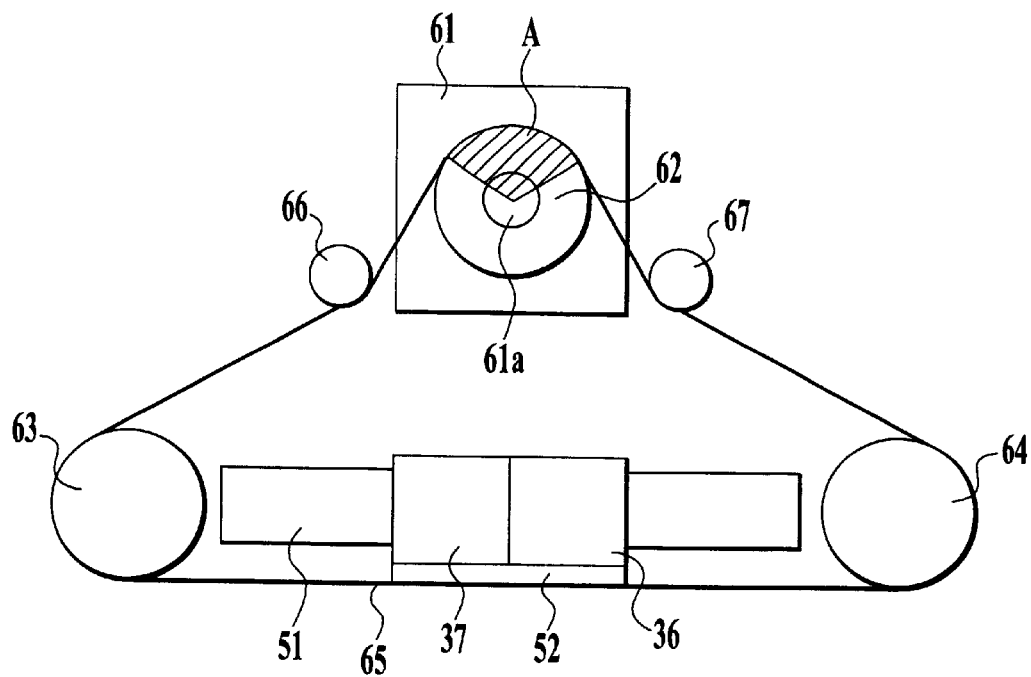
FIG. 4 is a schematic enlarged plan view showing the movable optical parts and a driving system thereof shown in FIG. 3.

In detail, as shown in FIG. 4, because the tension pulleys (idler timing pulleys) 66 and 67 are provided for the timing belt 65 on both sides of driving timing pulley 62, an engagement part A in which the timing belt 65 is engaged with the driving timing pulley 62 is extended like an area in which slant lines are drawn.

That is, the percentage of the engagement becomes high as compared with the case of no tension pulley or the case of one tension pulley.

Figure 5:
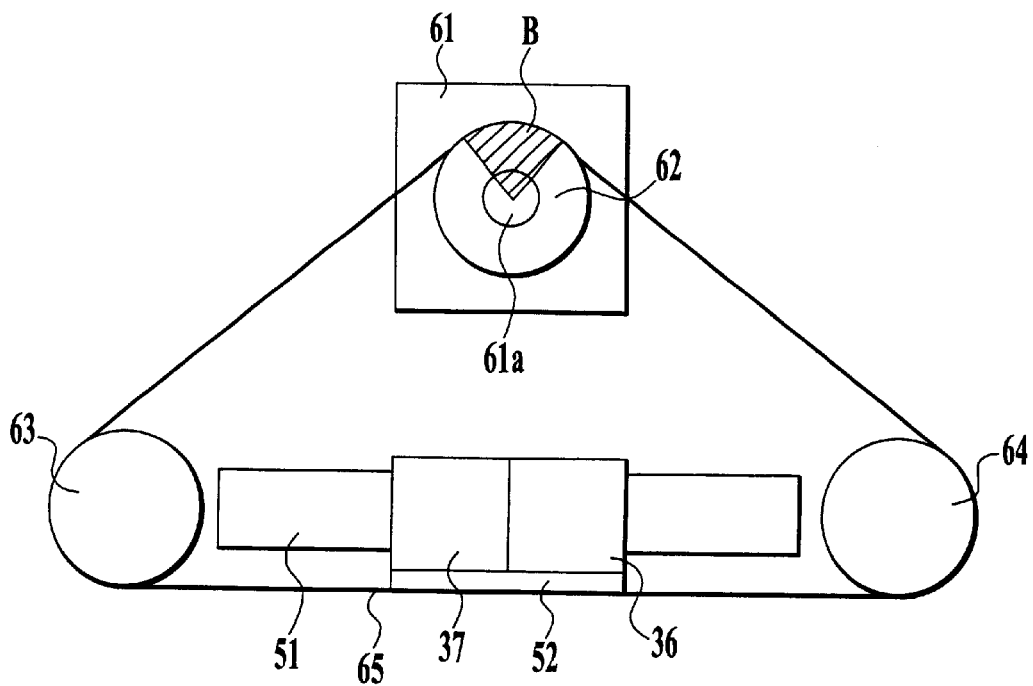
FIG. 5 is a schematic plan view showing a comparative example which is compared with the driving system shown in FIG. 4.

FIG. 5 shows a comparative example which is compared with the driving device shown in FIG. 4. As shown in FIG. 5, for example, in case of no tension pulley, an engagement part B in which the timing belt 65 is engaged with the driving timing pulley 62 is small like an area in which slant lines are drawn.

That is, in case of no tension pulley, as shown in FIG. 5, the percentage of the engagement (referred to the engagement part B) of the timing belt 65 with the driving timing pulley 62 is low. Similarly, in case of one tension pulley, the percentage of the engagement is low.

However, as shown in FIG. 4, by providing a pair of tension pulleys 66 and 67 for the timing belt 65 on both sides of the driving timing pulley 62, the percentage of the engagement (referred to the engagement part A) of the timing belt 65 with the driving timing pulley 62 is extended like an area in which slant lines are drawn. As a result, the problem about the failure in the engagement can be solved. Further, a pair of movable mirrors 36 and 37 can be moved at the same initial speed in both right and left directions.

Therefore, the wavelength of a light can be measured more precisely.

Although in the above-described embodiment, the He—Ne laser light is a reference light, the reference light is not limited to this. Another laser light may be used.

Needless to say, any other concrete detail constructions may be suitably changed.

As described above, according to the present invention, the percentage of an engagement of the timing belt with the driving timing pulley is increased by a pair of tension pulleys provided for the timing belt on both sides of the driving timing pulley. As a result, the problem about the failure in the engagement can be solved. Further, the optical part can be moved at the same initial speed in both directions.

Further, because the distance between the driving timing pulley and one driven timing pulley is the same as one between the driving timing pulley and the other driven timing pulley by disposing the driving timing pulley at an approximate center between the pair of driven timing pulleys, the optical part can be moved at the same initial speed in both directions.

According to the present invention, because the movable optical part can be moved a long distance along an optical axis which is approximately parallel to the optical axis of the reference light, the wavelength of a light can be measured more precisely. Further, the casing can be sufficiently small.

Because the optical part can be moved at the same initial speed in both directions by the above-described optical part driving device, it can be achieved that the wavelength of a light is measured more precisely.

According to the present invention, because the movable reflecting member can be moved a long distance along an optical axis which is approximately parallel to the optical axis of the reference light, the wavelength of a light can be measured more precisely. Further, the casing can be sufficiently small. Because the movable reflecting member can be moved at the same initial speed in both directions by the above-described optical part driving device, it can be achieved that the wavelength of a light is measured more precisely.

Further, because the pair of movable reflecting members is moved between the pair of fixed reflecting members on an optical axis which is approximately parallel to the optical axis of the reference light so as to reflect each light totally, a wide range in which an optical path difference between two lights is caused can be obtained.

The entire disclosure of Japanese Patent Application No. Tokugan-Hei 11-86738 filed on Mar. 29, 1999 including specification, claims drawings and summary are incorporated herein by reference in its entirety.

What is claimed is:

1. An optical part driving device for moving an optical part, comprising:

a driving timing pulley, a pair of driven timing pulleys, a timing belt wound by the driving timing pulley and the driven timing pulleys and connected with the optical part between the pair of driven timing pulleys a pair of tension pulleys for tensing the timing belt on both sides of the driving timing pulley, and a block for attaching the driving timing pulley, the driven timing pulleys and the tension pulleys to a casing of an optical apparatus;

wherein the driving timing pulley, the driven timing pulleys and the tension pulleys are incorporated into the block and the block is detachable from the casing.

2. The optical part driving device as claimed in claim 1, wherein the driving timing pulley is disposed at an approximate center between the pair of driven timing pulleys.

3. An optical interferometer comprising:

a casing;

a plurality of optical parts for branching an input light into two branched lights, for causing a path difference between the two branched lights and for interfering one branched light with the other branched light by recombining the two branched lights, the plurality of optical parts comprising a movable optical part which is movable with respect to the casing; and an optical part driving device for moving the plurality of optical parts, comprising: a driving timing pulley, a pair of driven timing pulleys, a timing belt wound by the driving timing pulley and the driven timing pulleys and connected with the movable optical part between the pair of driven timing pulleys, a pair of tension pulleys for tensing the timing belt on both sides of the driving timing pulley, and a block for attaching the driving timing pulley, the driven timing pulleys and the tension pulleys to the casing;

wherein the driving timing pulley, the driven timing pulleys and the tension pulleys are incorporated into the block and the block is detachable from the casing.

4. An optical interferometer comprising a casing;

a beam splitter for branching each of a reference light and a light to be measured into two optical paths for a transmitted light and a reflected light which are perpendicular to each other, and for recombining the reflected light and the transmitted light to obtain a recombined light;

a plurality of reflecting members for reflecting the reflected light and the transmitted light so as to cause a path difference between the reflected light and the transmitted light, the plurality of reflecting members comprising a movable reflecting member which is movable with respect to the casing;

a photo-detector for receiving the recombined light in order to obtain an interference fringe of the reference light and an interference fringe of the light to be measured; and an optical part driving device for moving the movable reflecting member, comprising: a driving timing pulley, a pair of driven timing pulleys, a timing belt wound by the driving timing pulley and the driven timing pulleys and connected with the movable reflecting member between the pair of driven timing pulleys, a pair of tension pulleys for tensing the timing belt on both sides of the driving timing pulley, and a block for attaching the driving timing pulley, the driven timing pulleys and the tension pulleys to the casing;

wherein the driving timing pulley, the driven timing pulleys and the tension pulleys are incorporated into the block and the block is detachable from the casing.

5. The optical interferometer as claimed in claim 4, wherein the plurality of reflecting members comprise a pair of fixed reflecting members for reflecting the reflected light and the transmitted light toward the other fixed reflecting member each other, and the movable reflecting member for totally reflecting the reflected light and the transmitted light toward each fixed reflecting member is disposed between the pair of fixed reflecting members.

6. The optical part driving device as claimed in claim 1, wherein the driving timing pulley and the driven timing pulleys are incorporated into the block so that each rotational axis of the driving timing pulley and the driven timing pulleys is normal to a bottom surface of the casing when the block is attached to the casing.

7. The optical interferometer as claimed in claim 4, wherein the driving timing pulley and the driven timing pulleys are incorporated into the block so that each rotational axis of the driving timing pulley and the driven timing pulleys is normal to a bottom surface of the casing when the block is attached to the casing.

8. The optical interferometer as claimed in claim 4, further comprising a driving motor for rotating the driving timing pulley;

wherein the plurality of reflecting members comprises two fixed reflecting members;

wherein the beam splitter and the two fixed reflecting members are disposed so as to form a triangle obtained by drawing three lines between the beam splitter and the two fixed reflecting members; and wherein the driving motor is disposed in the triangle.

9. The optical interferometer as claimed in claim 8, wherein the driving motor is disposed at a center of the triangle.

10. The optical interferometer as claimed in claim 8, wherein the block is disposed in the triangle when the block is attached to the casing.

* * * * *